United States Patent [19]

Mesnel

[11] Patent Number: 5,495,680
[45] Date of Patent: Mar. 5, 1996

[54] CURING LINE OVEN WITH VARIABLE IN-LINE UHF MODULE

[75] Inventor: Gerard Mesnel, Carrieres, France

[73] Assignee: The Standard Products Company, Cleveland, Ohio

[21] Appl. No.: 184,474

[22] Filed: Jan. 21, 1994

[51] Int. Cl.⁶ .................................................. F26B 3/34
[52] U.S. Cl. ............................ 34/264; 34/265; 34/420; 34/426
[58] Field of Search ......................... 34/90, 181, 210, 34/214, 217, 259, 264, 265, 68, 418, 420, 423, 426

[56] References Cited

U.S. PATENT DOCUMENTS

| 3,596,367 | 8/1971 | Crandall ........................... 34/418 |
| 4,352,854 | 10/1982 | Siedenstrang et al. . |
| 4,391,765 | 7/1983 | Lee et al. . |
| 4,405,850 | 9/1983 | Edgar ............................. 34/265 |
| 4,459,249 | 7/1984 | Matsuda . |
| 4,496,827 | 1/1985 | Sturdevant . |
| 4,499,036 | 2/1985 | Hawkes, Jr. . |
| 4,512,942 | 4/1985 | Babbin et al. . |
| 4,548,771 | 10/1985 | Senapati et al. . |
| 4,640,020 | 2/1987 | Wear et al. ........................ 34/68 |
| 4,699,578 | 10/1987 | Sumner et al. . |
| 4,702,867 | 10/1987 | Sejimo et al. . |
| 4,783,287 | 11/1988 | Eichberger et al. . |
| 4,822,537 | 4/1989 | Lanier et al. . |
| 4,980,384 | 12/1990 | Takahashi et al. . |
| 4,990,539 | 2/1991 | Hahn et al. . |
| 5,010,220 | 4/1991 | Apte et al. . |
| 5,051,586 | 9/1991 | Sabreen . |
| 5,166,484 | 11/1992 | Young et al. . |

FOREIGN PATENT DOCUMENTS

WO91/14144  9/1991  WIPO ................................ 34/265

Primary Examiner—Henry A. Bennett
Assistant Examiner—Susanne C. Tinker
Attorney, Agent, or Firm—Harness, Dickey & Pierce

[57] ABSTRACT

A continuous extrusion and curing line has a linear hot air curing furnace which includes at least one UHF module which is selectively linearly movable along a length of the furnace.

6 Claims, 1 Drawing Sheet

CURING LINE OVEN WITH VARIABLE IN-LINE UHF MODULE

BACKGROUND OF THE INVENTION

The present invention relates to a continuous extrusion and curing line for elastomeric materials such as dense cellular or sponge rubber and for thermosetting materials generally. More particularly the present invention relates to continuous extrusion and hot air curing lines equipped with at least one selectively movable UHF microwave module.

Synthetic rubber products such as extruded sealing strips, gaskets, glass run channel and the like are conventionally made in continuous production lines by extruding an uncured or green rubber extrudate into a desired cross-sectional shape and then curing the extrudate by heating the extrudate and maintaining it at an elevated temperature until it is cured. Elevated temperatures are maintained by use of in-line hot air ovens. In some production lines UHF microwave pre-heaters are used to supply the initial heat for cross-linking, i.e., for curing of the polymeric extrudate. UHF pre-heaters are also known to be combined with other types of curing medium such as ballotinies. In this case UHF can be located before or in a predetermined cut section of the production line.

Where the desired products are dense rubber or cellular rubber products, the conventional use of UHF pre-heaters in combination with hot air is poorly adapted to the successful manufacture of such products. The poor efficiency of UHF preheaters at low temperatures requires the use of relatively high temperatures in the hot air tunnel to cure the product. The use of relatively high temperatures drives lubricant from the products and utilizes the hot air oven in an inefficient manner because only a small portion of hot air volume can be recycled. UHF energy effectively applies heat to the interior of the extrudate rather than the exterior, and if such heat is applied too early in the process, then undesirable results can occur. For example, where the product is cellular rubber, use of UHF too early in the process line leads to excessive and early blowing with associated problems of extrusion distortion, collapsing of foam cells or excessive open cells. Use of UHF too late in the process leads to lower efficiency of the UHF process. Also, optimal power of UHF cannot be used with satisfactory results when it is applied to an extruded product which is not crosslinked at the start of the procedure and, hence, is highly ductile.

Thus, while use of UHF to induce blowing and/or to accelerate crosslinking may be useful, one of the difficulties in practice is to balance the process with aggravated conditions when using the cure line to vulcanize different formulations of products. Complex factors must be taken into consideration such as thermodynamic action of the UHF, the phenomenon of ionizing of the carbon atoms forming the plasma polarized by the electric field, and the action of the cross-linking phenomenon continuing until the extrusion is cured. The present invention allows one to take these factors into consideration and provide a technique for balancing factors to obtain a desired result.

The advantages of the present invention will become further apparent from the following disclosure taken in conjunction with the accompanying drawings and the appended claims.

SUMMARY OF THE INVENTION

In accordance with the present invention a continuous extrusion and curing line oven has a linear hot air curing furnace which includes at least one and preferably a plurality of UHF modules which are selectively linearly moveable along the length of the furnace. The present invention also relates to, but is not restricted to, the method of curing a thermosetting material wherein an extrudate is subjected to convective heat and to UHF energy, the application of UHF energy being applied sequentially with hot air along a line of movement of the extruded material, the UHF energy being applied in a selective and variable position along the movement of extruded material. The UHF cells are selectively moveable along the line so that the power released by the cells can be "tuned" to apply at the points where the expansion and cross-linking operations are optimized. Thus, the UHF power can be applied along the line where the activity of blowing agents is most responsive to the UHF power. The present invention offers increased process control for improved product quality, more consistent quality control and reduced scrap and therefor an improved economy of process. Preferably, the desired position or positions of UHF energy application is or are selectively determined in a feedback mechanism and in response to certain process parameters such as the temperature, shape, and/or dimensions of the extrudate.

DESCRIPTION OF THE PREFERRED EMBODIMENTS

Figure 1:
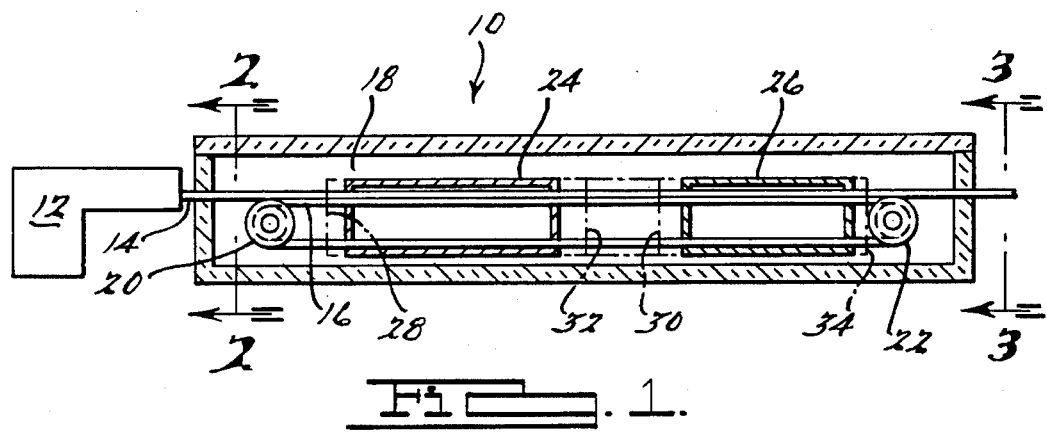
FIG. 1 is somewhat schematic view of a process line using a preferred embodiment of an apparatus of the present invention.

Now referring to FIG. 1, a curing line oven with a variable in-line UHF module of the present invention is shown and indicated generally by the numeral 10. From left to right as viewed in FIG. 1, an extruder 12 is positioned to feed extrudate 14 onto conveyor belt 16 which conveys the extrudate into hot air oven 18.

Extruder 12 can be any desired extruder suitable for the selected thermosettable extrudate. Conventional, commercially available extruders are well known in the art. The particular extruder employed in the present invention is not critical so long as the extruder is well adapted to provide an extrudate suitable and desirable for the present process.

Conveyor belt 16 is a conventional endless belt supported on driven and undriven rollers 20 and 22. Conveyor belt 16 carries extrudate 14 downstream of extruder 12 and through oven 10. Oven 10 includes a hot air, convection furnace 18 such as is conventional in the art for use as a curing oven. Oven 10 also includes a pair of selectively linearly movable UHF modules 24 and 26 as set forth in more detail hereinafter. Suitable hot air furnaces 18 and UHF modules 24 and 26 are conventional in the art and are commercially available.

UHF modules 24 and 26 are selectively positioned within oven 10. Each UHF module 24 and 26 is independently selectively movable linearly along belt 16 leftwardly or rightwardly as viewed in FIG. 1. Thus, module 24 can be moved within a zone indicated by numerals 28 and 30 within oven 10 and module 26 can be moved within a zone indicated by numerals 32 and 34 within oven 10.

Figure 2:
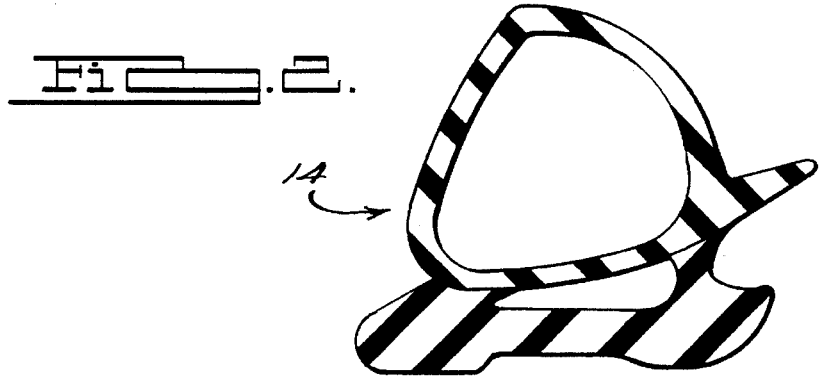
FIG. 2 is a cross-sectional view, broken away, taken along line 2—2 in FIG. 1.
Figure 3:
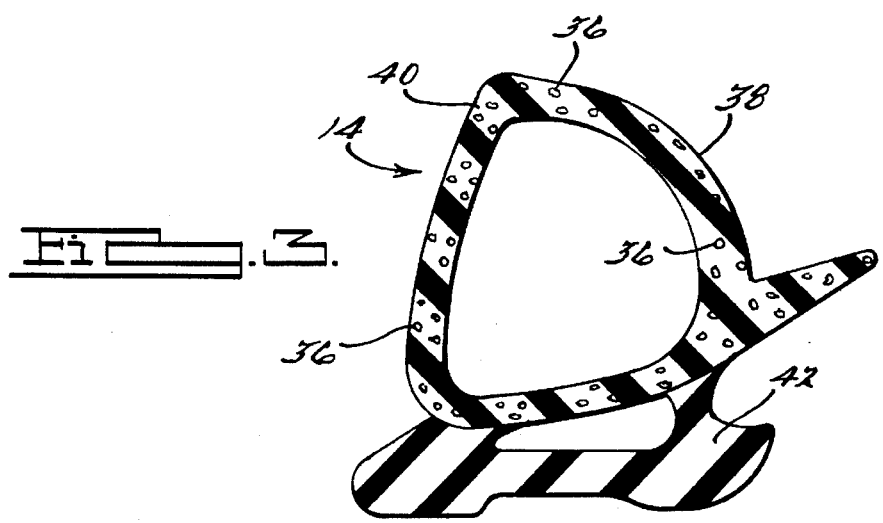
FIG. 3 is a cross-sectional view, broken away, taken along line 3—3 in FIG. 1.

By way of example, in operation and in accordance with the process of the present invention, extruder 12 extrudes a thermosetting extrudate 14 which has the initial uncured cross-sectional shape shown in FIG. 2. Extrudate 14 is carried into furnace 18 of oven 10 immediately after extrusion where it initially has a first desired temperature. Extrudate 14 is then contacted by microwave energy from UHF module 24. Module 24 is selectively linearly positioned along conveyor belt 16 to stabilize the dimension of dense rubber while accelerating generation of cells 36 of cellular rubber. Following module 24 extrudate 14 passes through hot air in the interior of furnace 18 of oven 10 where the skin 38 of the extrudate is further cured. Then, extrudate 14, now partially cured, passes into module 26 where further UHF energy is applied to the interior thereof. Module 26 is selectively linearly positioned along conveyor belt 16 to accelerate the cross-linking process. The final product has a cellular foam tube 40 and a dense rubber base 42.

It will be appreciated by those skilled in the art that only one UHF module, or alternatively a plurality of UHF modules may be employed in the present invention as is desired for the particular application and product. Furthermore, the present invention is well adapted for use with a variety of thermoset products. Thus, it is contemplated that the present invention will be subject to modification and variation within the broad scope of the invention which is intended to be limited only by the scope of the appended claims.

What is claimed is:

1. A continuous curing line oven includes:

an elongated hot air furnace with a conveyor device in the interior thereof for conveying an extrudate along a length of said furnace through the interior thereof, at least one UHF module in the interior of said furnace and selectively linearly movable along a length of said conveyor device within the hot air furnace.

2. A continuous curing line oven as in claim 1 including a plurality of UHF modules which are selectively linearly movable along a length of said conveyor device and which are placed sequentially along said conveyor device.

3. A continuous curing line oven as in claim 2 including a pair of said UHF modules.

4. A method of curing a thermosetting material comprising the steps of:

extruding an uncured thermosettable extrudate, carrying said extrudate through a hot air furnace by a conveying device, applying convective heat to said extrudate, applying UHF microwave energy to said extrudate, and further applying convective heat to said extrudate, wherein the point of application of said UHF microwave energy is selectively positioned along the length of said conveying device within the hot air furnace.

5. The method of claim 4 including an additional step of applying UHF microwave energy to said extrudate.

6. The method of claim 4 wherein said step of applying UHF microwave energy is carried out by selectively positioning a UHF module to optimize a desired parameter.

* * * * *